US011927169B2

(12) United States Patent
Rohl et al.

(10) Patent No.: US 11,927,169 B2
(45) Date of Patent: *Mar. 12, 2024

(54) HYDROPOWER ELECTRIC GENERATOR

(71) Applicants: Karl Baron Rohl, Babylon, NY (US); Kenneth Bruce Rohl, Babylon, NY (US)

(72) Inventors: Karl Baron Rohl, Babylon, NY (US); Kenneth Bruce Rohl, Babylon, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,716

(22) Filed: Jun. 17, 2022

(65) Prior Publication Data
US 2023/0407832 A1  Dec. 21, 2023

(51) Int. Cl.
*F03B 13/06* (2006.01)
*G08B 21/18* (2006.01)

(52) U.S. Cl.
CPC ............ *F03B 13/06* (2013.01); *G08B 21/182* (2013.01); *F05B 2220/7064* (2013.01)

(58) Field of Classification Search
CPC . F03B 13/06; G08B 21/182; F05B 2220/7064
See application file for complete search history.

(56) References Cited

U.S. PATENT DOCUMENTS 11,041,475 B2    6/2021  Rohl
2021/0088023 A1* 3/2021  Rohl ........................ F03B 13/06

* cited by examiner

*Primary Examiner* — Viet P Nguyen

(57) ABSTRACT

Disclosed herein is a hydropower electric generator, in accordance with some embodiments. Accordingly, the hydropower electric generator may include a closed conduit. Further, the closed conduit may include a reservoir, two downward flow pipes, two horizontal pipes, and two upward flow pipes. Further, the downward flow pipes may include turbines configured to intercept the downward flow of the water and generate rotational force. Further, the upward flow pipe may include an airlift assembly configured to receive compressed air into the upward flow pipe. Further, the hydropower electric generator may include an air pump configured to generate the compressed air based on electrical energy. Further, the hydropower electric generator may include an energy storage device.

18 Claims, 12 Drawing Sheets

HEAD PRESSURE OF A COLUMN OF WATER 700

| Height | Pressure |
|--------|----------|
|        |          |
| 10'    | 4.43 psi |
| 11'    | 4.87 psi |
| 12'    | 5.316 psi |
| 13'    | 5.759 psi |
| 14'    | 6.202 psi |
| 15'    | 6.645 psi |
| 16'    | 7.088 psi |
| 17'    | 7.531 psi |
| 18'    | 7.974 psi |
| 19'    | 8.417 psi |
| 20'    | 8.86 psi |
| 21'    | 9.303 psi |
| 22'    | 9.746 psi |
| 23'    | 10.189 psi |
| 24'    | 10.632 psi |
| 25'    | 11.075 psi |
| 26'    | 11.518 psi |
| 27'    | 11.961 psi |
| 28'    | 12.404 psi |
| 29'    | 12.847 psi |
| 30'    | 13.29 psi |

FIG. 7

Theoretical & Net Power Output

Using the formula: Theoretical Power output [TKw] = Q x H/ 708

Where by: Q= Flow in CFM

H= Height in Feet

708= constant

Power transmission manufactures are claiming efficiency rating of 97% for single belt drives.

In 6" piping with a head of 30' for each of two vertical pipes, the TKw is:

60.1 x 30 x .97/ 708   The TKw is 2.47 Kw for each pipe. The total output is 4.94 Kw.

In 8" piping with a head of 30' for each of two vertical pipes, the TKw is:

90.9 x 30 x .97/ 708 The TKw is 3.73 Kw for each pipe. The total output is 7.47 Kw.

In 10" piping with a head of 30' for each of two vertical pipes, the TKw is:

120.36 x 30 x .97/ 708 The Tkw is 4.94 Kw for each pipe. The total output is 9.89 Kw.

FIG. 12

HYDROPOWER ELECTRIC GENERATOR

FIELD OF THE INVENTION

Generally, the present disclosure relates to the field of electrical generator. More specifically, the present disclosure relates to arranging an Alternating Current (AC) generator comprising water flowing through a closed conduit and an airlift assembly that passes compressed air into the closed conduit to return the water to a position above the AC generator.

BACKGROUND OF THE INVENTION

The generation of AC electrical energy utilizing clean, renewable, environmentally friendly methods has become a national priority in the United States. The ever-increasing demand for electricity and reliance upon foreign oil supply has given migraines to the economies of the world. The concept of extracting electricity from water has been employed for generations. Large scale producers of hydroelectric power have relied upon natural rivers, streams, or waterfalls. However, the current technologies have geographic limitations, and the implementation of a hydroelectric dam has disastrous consequences for the environment. Even water levels in creeks, streams, and rivers fluctuate under their natural cycles and do not provide consistent power. The most efficient use of electricity is when the electrical consumer is geographically close to the power supply, and there is a continuous reliable source of energy.

Therefore, there is a need for an improved hydropower electric generator that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a hydropower electric generator, in accordance with some embodiments. Accordingly, the hydropower electric generator may include a closed conduit. Further, the closed conduit may include a reservoir configured to hold water. Further, the reservoir may include a first inlet port and a second inlet port and a first outlet port and a second outlet port. Further, the closed conduit may include a first downward flow pipe and a second downward flow pipe that may each include an upper end and a lower end. Further, the upper end of the first downward flow pipe may be connected to the first outlet port of the reservoir and the upper end of the second downward flow pipe may be connected to the second outlet port of the reservoir with each configured to permit downward flow of the water from the reservoir toward the lower ends due to gravitational force. Further, the first downward flow pipe may include a first turbine and the second downward flow pipe may include a second turbine each configured to intercept the downward flow of the water and generate rotational force. Further, the first downward flow pipe may include a first DC alternator coupled to the first turbine and the second downward flow pipe may include a second DC alternator coupled to the second turbine. Further, the first DC alternator and the second DC alternator may be configured to generate DC electrical energy based on the rotational force generated by the first turbine and the second turbine. Further, the closed conduit may include a first horizontal pipe and a second horizontal pipe. Further, an inlet end of the first horizontal pipe may be connected to the lower end of the first downward flow pipe and an outlet end of the horizontal pipe may be connected to a lower end of a first upward flow pipe. Similarly, an inlet end of the second horizontal pipe may be connected to the lower end of the second downward flow pipe and an outlet end of the second horizontal pipe may be connected to a lower end of a second upward flow pipe. Further, the closed conduit may include the first upward flow pipe and the second upward flow pipe. Further, the lower end of the first upward flow pipe may be connected to the second end of the first horizontal pipe and the upper end of the first upward flow pipe may be connected to the first inlet port of the reservoir. Similarly, the lower end of the second upward flow pipe may be connected to the second end of the second horizontal pipe and the upper end of the second upward flow pipe may be connected to the second inlet port of the reservoir. Further, the first upward flow pipe may include a first airlift assembly configured to receive compressed air into the first upward flow pipe and the second upward flow pipe may include a second airlift assembly configured to receive compressed air into the second upward flow pipe. Further, the hydropower electric generator may include an air pump configured to generate the compressed air based on electrical energy. Further, the air pump may include an inlet port of the air pump and an outlet port of the air pump. Further, the inlet port of the air pump may be configured to receive air from a surrounding atmosphere of the hydropower electric generator. Further, the outlet port of the air pump may be connected to the airlift assembly. Further, the hydropower electric generator may include an energy storage device electrically connected to each of the DC alternators. Further, the energy storage device may be configured for storing the electrical energy produced by each of the DC alternators. Further, the air pump may be electrically connected to the energy storage device and receives electrical energy from the energy storage device.

Further disclosed herein is a hydropower electric generator in alternative embodiments wherein the air pump may comprise a departure cooling line and a return cooling line. The first horizontal pipe and/or the second horizontal pipe may comprise a departure outlet port connected to the departure cooling line allowing water to flow to the departure cooling line from the horizontal pipe. The first upward flow pipe and or the second upward flow pipe may comprise a return inlet port connected to the return cooling line allowing water to be received from the return cooling line. Further the air pump may comprise an inlet cooling port and an outlet cooling port, the inlet cooling port connected to the departure cooling line and configured to receive water from the departure cooling line and the outlet cooling port connected to the return cooling line and configured to allow water to flow to the return cooling line.

Further disclosed herein is a hydropower electric generator in alternative embodiments wherein the first airlift assembly and the second airlift assembly may include a core with a plurality of perforations. Further, the plurality of perforations may be configured to create a negative pressure based on a vertical rise of the air in a water column in the upward pipe provide kinetic energy to assist water flow in the first upward flow pipe, the second upward flow pipe, the first horizontal pipe, and the second horizontal pipe.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 7 is a table of minimum air pressure required to be introduced at the lower end to the first and second upward flow pipes for a determined height of a water storage source, in accordance with some embodiments.

FIG. 12 is a power sheet outlining the theoretical and net output power of the present invention.

DETAILED DESCRIPTION OF THE INVENTION

Figure 1:
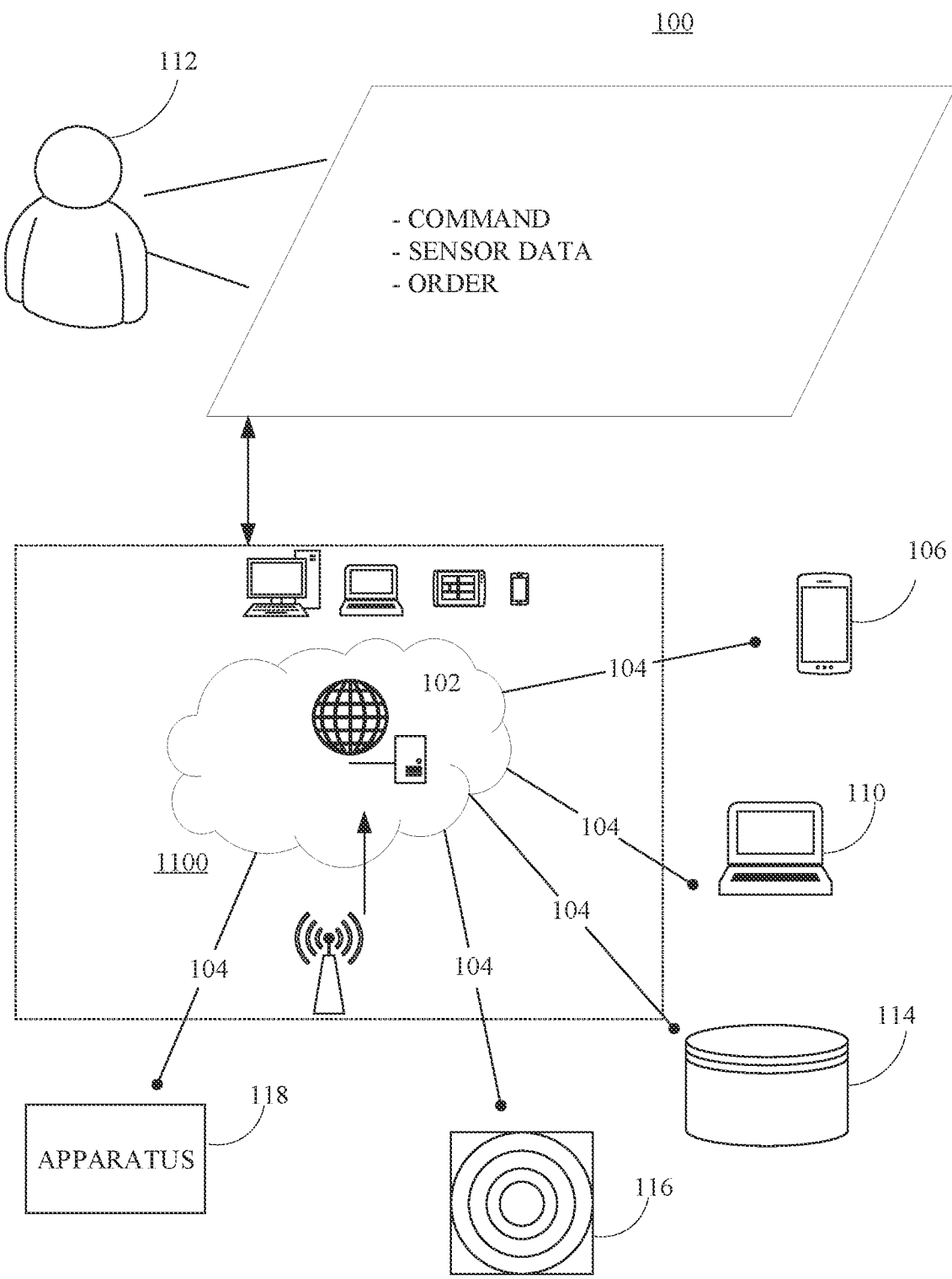
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of hydropower electric generator, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes a hydropower electric generator. Further, the disclosed hydropower electric generator may be capable of delivering electricity at the demand site and function continuously with minimum annual maintenance. Further, the disclosed hydropower electric generator may be installed at any location while maintaining a clean and reliable output of useable electrical power while simultaneously providing the power required for internal functions. Further, the disclosed hydropower electric generator comprises a novel combination of components that requires low maintenance and that can efficiently work in all altitudes of operation. Further, water is circulated in a closed-loop by the force of gravity along one direction and pneumatically transferred to a larger area of the assembly at a higher position within the closed-loop, storing potential energy above the assembly. According to Boyles Law, when compressed air is introduced into the closed-loop, it rises and expands, delivering water and air up the closed-loop into the higher position. The potential energy of water through gravity translates to the kinetic energy of the running water, which is extracted as DC, and this extracted DC is inverted to usable AC, via inverters. The AC output is connected to the local power grid for general consumption or to be stored via conventional methods such as batteries. The air pumped through the system may also be in an enclosed loop if the installation location or altitude of the installation is significantly higher than sea level, or in any other condition where there is a significant pressure differential between the interior and exterior of the present disclosure. Thus, it is an aim of the disclosed hydropower electric generator for converting potential and kinetic energy into electrical energy in a clean and environmentally friendly fashion with a consistent reliable output.

Further, the present disclosure describes hydropower electric generating apparatus consisting of specific components combined in a novel configuration to generate D.C. electricity to power the components and produce a surplus electrical output to be inverted to A.C. electricity for general consumption. Further, A.C. electricity may be generated without the consumption of fuel of any nature, or any external power source, nor reliance upon un-predictable natural sources including wind, sunlight, waves, currents, tides, streams, creeks, or rivers. The novel combination of the components together is an efficient, low maintenance generator that has applications in all altitudes of operation. Kinetic energy is generated through an airlift in a water column and transferred to a single reservoir storing potential energy above the assembly. The potential and kinetic energy are extracted through water turbines and D.C. generators. The extracted energy is inverted to usable A.C. electric current. The output power is continuous with the apparatus requiring brief annual maintenance.

Further, in exploring new sources of energy, it is remiss not to consider the natural forces available to extract usable energy and develop it into electrical energy. The alternative sources of solar and wind are not consistent sources. Even creeks, streams, tidal, and river levels fluctuate under their natural cycles and do not provide consistent power. The constant, renewable power delivered by the present disclosure is from natural and consistent energy. Recently, there have been significant advances in technology, increasing the efficiencies of components detailed in the present disclosure to deem the novel configuration (or the combination) of devices a valuable solution to supplement the electricity requirements for electrical consumers. In the last 18 months, significant technological advances were developed in the key component efficiencies of the present disclosure; prior to these developments, this method was not efficient enough to produce a positive output of electricity. Further, the disclosed hydropower electric generator has the potential to be installed in every household or structure at a reasonable cost and will function continuously with minimum annual maintenance.

Further, the disclosed hydropower electric generator may include a combination of airlift, single reservoir, water turbine D.C. electrical generator, and efficient inverter with advantages similar to large scale hydroelectric plants currently in operation.

The disclosed hydropower electric generator may include the closed-loop of water through two vertical columns with a reservoir at the top to separate water from the air; two water turbines are in the lower sections of the enclosed loop. The air may also be an enclosed loop if the installation location or altitude of the installation is significantly higher than the sea level. Potential energy through gravity is extracted through water turbines at the bottom of the water flowing down column producing D.C. electricity. Utilizing Boyles Law, the air introduced in water rises and expands delivering water and air up the column to the reservoir. D.C. power is supplied to the air pump and an inverter with an A.C. power output. The A.C. output is connected to the local power grid for consumption.

The use of water with turbines for generating electricity is known in prior art. Known prior art includes: U.S. Pat. No. US 2010/0084866 A1; U.S. Pat. Nos. 7,740,455 B1; 6,942,463 B2; 6,817,180 B2; 6,225,706; 4,478,553; 4,797,653; 5,537,813; 4,522,151; WO91/0291; WO 2007/073358 A1; EP 1 739 303 A1; JP 2004360517 (A).

While conventional devices fulfill their respective, particular objectives and requirements, the conventional devices do not include the novel combination of components described in this present disclosure. Many rely on external water and air sources, rivers, have pistons, several reservoirs, series of air filled tanks and conveyor belts, have buckets, or are offshore deep water applications, with many components requiring substantial regular maintenance.

FIG. 1 is an illustration of an online platform 100 consistent with various embodiments of the present disclosure. By way of non-limiting example, the online platform 100 to facilitate the generation of energy by a hydropower electric generator may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116, and apparatus 118 (such as a hydropower electric generator 200) over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1100.

Figure 2:
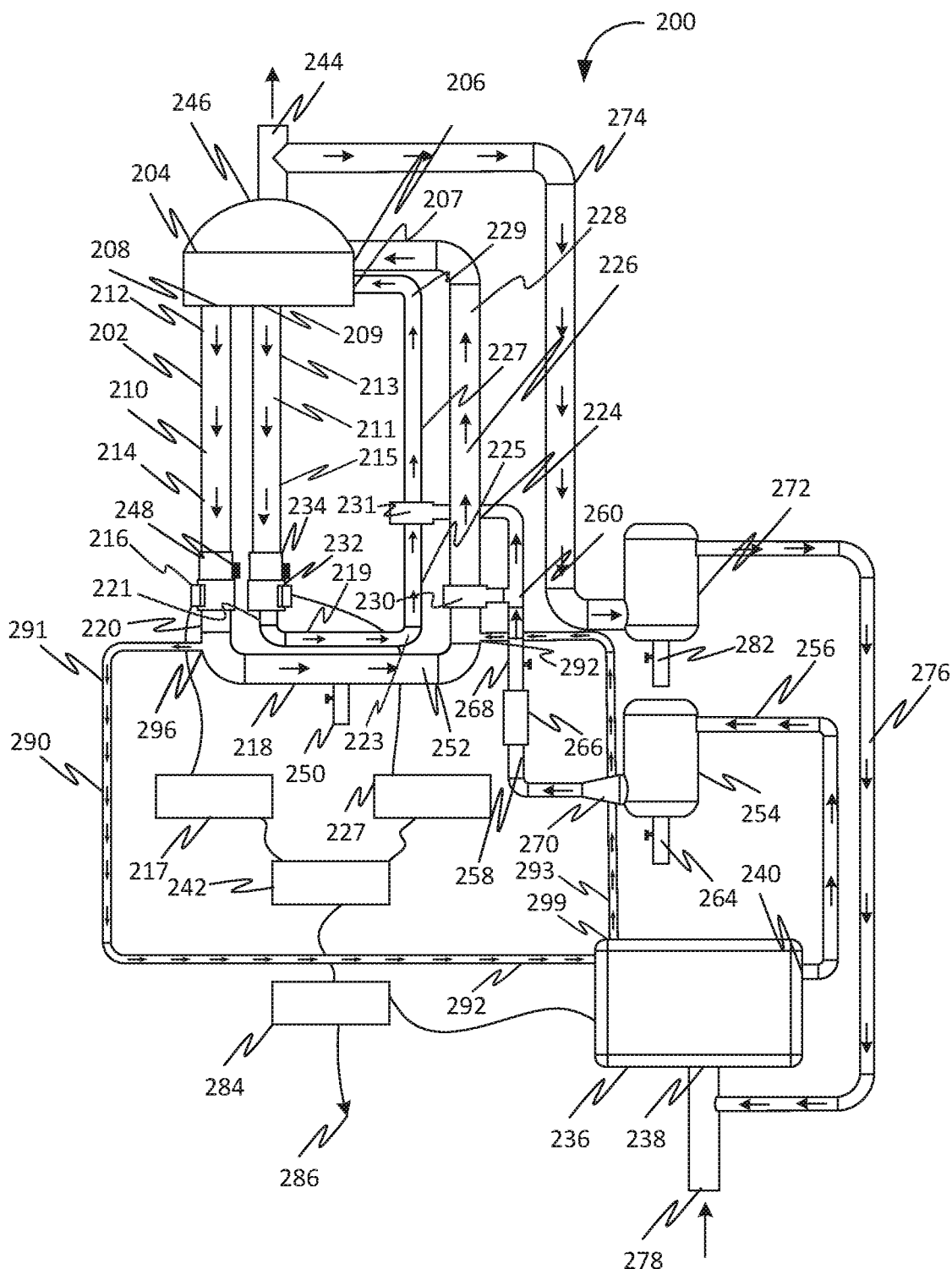
FIG. 2 is a front view of a hydropower electric generator, in accordance with some embodiments.

FIG. 2 is a front view of a hydropower electric generator 200, in accordance with some embodiments. Accordingly, the hydropower electric generator 200 may include a closed conduit 202. Further, the closed conduit 202 may include a reservoir 204 configured to hold water. Further, the reservoir 204 may include a first inlet port 206, a second inlet port 207, a first outlet port 208, and a second outlet port 209. Further, the closed conduit 202 may include a first downward flow pipe 210 and a second downward flow pipe 211. Further, the first downward flow pipe 210 may include an upper end 212 and a lower end 214. Similarly, the second downward flow pipe 211 may include an upper end 213 and a lower end 215. Further, the upper end 212 of the first downward flow pipe 210 may be connected to the first outlet port 208 of the reservoir 204 and configured to permit downward flow of the water from the reservoir 204 toward the lower end 214 of the first downward flow pipe 210 due to gravitational force. Further, the upper end 212 of the first downward flow pipe 210 may be connected to the first outlet port 208 of the reservoir 204 using at least one connecting mechanism. Further, the first downward flow pipe 210 may include a first turbine 216 configured to intercept the downward flow of the water and generate rotational force. Further, the first downward flow pipe 210 may include a first DC alternator 217 coupled to the first turbine 216. Further, the first DC alternator 217 may be configured to generate DC electrical energy based on the rotational force generated by the first turbine 216. Similarly, the upper end 213 of the second downward flow pipe 211 may be connected to the second outlet port 209 of the reservoir 204 and configured to permit downward flow of the water from the reservoir 204 toward the lower end 215 of the second downward flow pipe 211 due to gravitational force. Further, the upper end 213 of the second downward flow pipe 211 may be connected to the second outlet port 209 of the reservoir 204 using at least one connecting mechanism. Further, the second downward flow pipe 211 may include a second turbine 232 configured to intercept the downward flow of the water and generate rotational force. Further, the second downward flow pipe 211 may include a second DC alternator 227 coupled to the second turbine 232. Further, the second DC alternator 227 may be configured to generate DC electrical energy based on the rotational force generated by the second turbine 232. Further, the closed conduit 202 may include a first horizontal pipe 218 and a second horizontal pipe 219. Further, an inlet end 220 of the first horizontal pipe 218 may be connected to the lower end 214 of the first downward flow pipe 210 using the at least one connecting mechanism and an inlet end 221 of the second horizontal pipe 219 may be connected to the lower end 215 of the second downward flow pipe 211 using at least one connecting mechanism. Further an outlet end 222 of the first horizontal pipe 218 may be connected to a lower end 224 of a first upward flow pipe 226 using the at least one connecting mechanism and an outlet end 223 of the second horizontal pipe 219 may be connected to a lower end 225 of a second upward flow pipe 227 using the at least one connecting mechanism. Further, the closed conduit 202 may include the first upward flow pipe 226 and the second upward flow pipe 227. Further, the lower end 224 of the first upward flow pipe 226 may be connected to the second end 222 of the first horizontal pipe 218 using the at least one connecting mechanism and an upper end 228 of the first upward flow pipe 226 may be connected to the first inlet port 206 of the reservoir 204 using the at least one connecting mechanism. Similarly, the lower end 225 of the second upward flow pipe 227 may be connected to the second end 223 of the second horizontal pipe 219 using the at least one connecting mechanism and an upper end 229 of the second upward flow pipe 227 may be connected to the second inlet port 207 of the reservoir 204 using the at least one connecting mechanism. Further, the first upward flow pipe 226 may include a first airlift assembly 230 configured to receive compressed air into the first upward flow pipe 226 and the second upward flow pipe 227 may include a second airlift assembly 231 configured to receive compressed air into the second upward flow pipe 227. Further, the receiving of the compressed air into the first upward flow pipe 226 and the second upward flow pip 227 may create a negative pressure at a bottom of the first airlift assembly 230 and the second airlift assembly 231. Further, the negative pressure may increase a kinetic energy of the upward flow of the water.

Further, in some embodiments, the reservoir 204 may include a first air vent 244 located on an upper surface 246 of the reservoir 204. Further, the first air vent 244 may be configured to permit air to vent from the reservoir 204 to the atmosphere through the first air vent 244. Further, the reservoir 204 may be configured for separating air from the water. Further, the water in the reservoir 204 may possess potential energy due to position in a gravitational field. Further, due to the potential energy of the water in the reservoir 204, the water flows downward in the first downward flow pipe 210 and the second downward flow pipe 211. Further, the reservoir 204 may include a standing body of natural water. Further, the reservoir 204 may include a single container located atop the hydropower electric generator 200, and functions to receive a mixture of air and water. Further, a level of water in the reservoir 204 may be monitored. Further, the level of water may be increased or decreased as necessary. Further, the first air vent 244 may be associated with a cylindrical shape. Further, the reservoir 204 may be configured to slow a flow of water coming from the upper end 228 of the first upward flow pipe 226 and the upper end 229 of the second upward flow pipe 227.

Further, the hydropower electric generator 200 may include an air pump 236 configured to generate the compressed air based on electrical energy. Further, the air pump 236 may include an inlet port 238 of the air pump 236 and an outlet port 240 of the air pump 236. Further, the inlet port 238 of the air pump 236 may be configured to receive air from a surrounding atmosphere of the hydropower electric generator 200. Further, the outlet port 240 of the air pump 236 may be connected to the airlift assembly 230 using the at least one connecting mechanism. Further, the air pump 236 may be supplied with DC electrical power for the operation that may be generated from at least one of the first turbine 216 and the second turbine 232.

Further the air pump 236 may include a departure cooling line 290 and a return cooling line 293 configured to provide water as a coolant from the closed loop 202 to the air pump 236. The departure cooling line 290 may comprise a first end 291 and a second end 292 and the return cooling line 293 may comprise a first end 294 and a second end 295. The horizontal pipe 218 may further comprise a departure outlet port 296 connected to the first end 291 of the departure cooling line 290 and configured to allow a small amount of water to flow from the closed loop 202 to the departure cooling line 290. The upward flow pipe may further comprise a return inlet port 297 connected to the second end 295 of the return cooling line 293 and configured to allow a small amount of water to flow from the return cooling line 293 to the closed loop 202. The air pump 236 may further comprise an inlet cooling port 298 and an outlet cooling port 299. The second end 292 of the departure cooling line may connect to the inlet cooling port 298 to allow water into the housing of the air pump 236 and the first end 294 of the return cooling line 293 may connect to the outlet cooling port 299 to allow water to exit the housing of the air pump 236 after being used for cooling purposes.

In the preferred embodiment, the departure cooling line 290 and the return cooling line 293 are in fluid connection with the closed loop 202 through the first horizontal pipe 218 and the first upward flow pipe 226, but may connect to the first downward flow pipe 210, the second downward flow pipe 211, the second horizontal pipe 219, and the second upward flow pipe 227 instead of or in addition to the first horizontal pipe 218 and the first upward flow pipe 226.

Further, the hydropower electric generator 200 may include an energy storage device 242 electrically connected to each of the first DC alternator 217 and the second DC alternator 227. Further, the energy storage device 242 electrically connected to each of the first DC alternator 217 and the second DC alternator 227 in accordance with electrical standards familiar to those skilled in the art.

Further, the energy storage device 242 may be configured for storing the electrical energy produced by each of the first DC alternator 217 and the second DC alternator 227. Further, the air pump 236 may be electrically connected to the energy storage device 242 and receives electrical energy from the energy storage device 242.

Further, in some embodiments, the first downward flow pipe 210 may include a first flow-control valve 248 located towards the lower end 214 of the first downward flow pipe 210. Further, the first flow-control valve 248 may be configured to control the flow of water through the first downward flow pipe 210. Similarly, the second downward flow pipe 211 may include a second flow-control valve 234 located towards the lower end 215 of the second downward flow pipe 211. Further, the second flow-control valve 234 may be configured to control the flow of water through the second downward flow pipe 211.

Further, in some embodiments, the first flow-control valve 248 and the second flow-control valve 234 may be configured to perform at least one of regulate, start and stop flow of water through the first downward flow pipe 210 and the second downward flow pipe 211.

Further, in some embodiments, at least one of the first turbine 216 and the second turbine 232 may include a reaction turbine that may include at least one of a bronze propeller and a non-metallic propeller. Further, the reaction turbine may be associated with high efficiency in low head applications.

Further, in some embodiments, an inner diameter and an outer diameter of each of the first downward flow pipe 210, the second downward flow pipe 211, the first horizontal pipe 218, the second horizontal pipe 219, the first upward flow pipe 226, the second upward flow pipe 227, the first airlift assembly 230, and the second airlift assembly 231 are identical. In other embodiments, the inner and outer diameters of the above-referenced pipes, conduits, and assemblies may vary to regulate flow through the closed loop 202.

Further, in some embodiments, the first horizontal pipe 218 may include a first drainage valve 250 configured to drain and fill a lower section 252 of the closed conduit 202 between the first flow-control valve 248 and the second flow-control valve 234 facilitating servicing of the first turbine 216. Similarly, the second horizontal pipe 219 may include a second drainage valve 251 configured to drain and fill the lower section 252 of the closed conduit 202 between the first flow-control valve 248 and the second flow-control valve 234 facilitating servicing of the second turbine 232.

Figure 4:
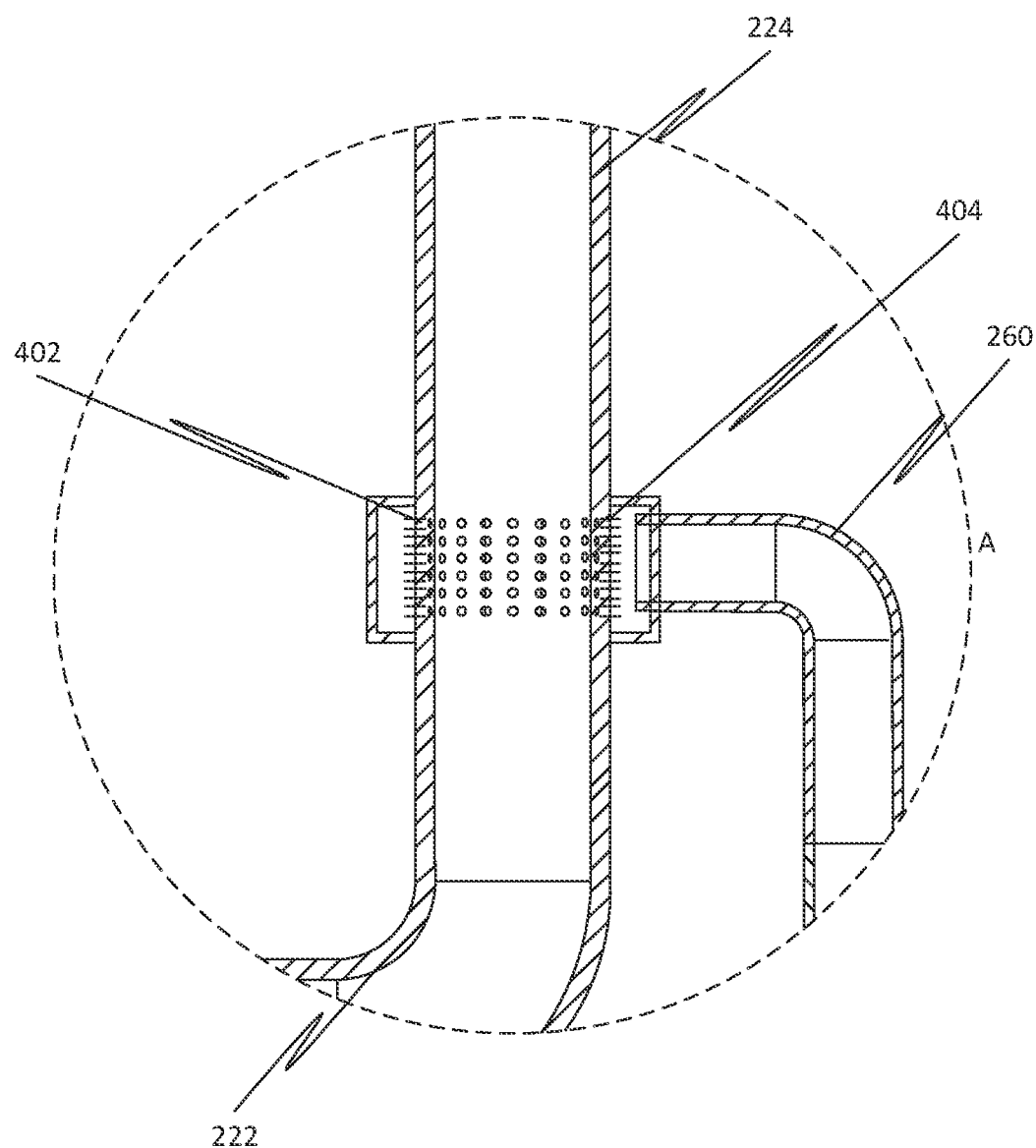
FIG. 4 is an enlarged view of a section A of FIG. 3, in accordance with some embodiments.

Further, in some embodiments, the first airlift assembly 230 and the second airlift assembly 231 may each include a core with a plurality of perforations 402-404 (as shown in FIG. 4). Further, the cores may be integrated with the first upward flow pipe 226 and the second upward flow pipe 227. Further, the first airlift assembly 230 and the second airlift assembly may each include a jacket that surrounds the core. Further, the jacket may include an inlet port. Further, the compressed air may be received peripherally into the core from the jacket. Further, the plurality of perforations 402-404 (as shown in FIG. 4) may deliver relatively small air bubbles in the core and the lower end 224 of the first upward flow pipe 226 and the lower end 225 of the second upward flow pipe 227. Further, according to the Boyles Law, the small air bubbles may rise and rapidly expand, as the small air bubbles travel up the first upward flow pipe 226 and the second upward flow pipe. Further, the negative pressure may be created by the rising of the small air bubbles in the first upward flow pipe 226 and the second upward flow pipe 227. Further, the negative pressure may increase the kinetic energy of the upward flow of the water. Further, the upward flow of the water may include at least one of the water and air. In further embodiments, the hydropower electric generator 200 may include a first moisture separator 254 configured to separate moisture from a mixture of air and water. Further, the hydropower electric generator 200 may include a fourth pipe 256 connecting the air pump 236 to the first moisture separator 254. Further, the hydropower electric generator 200 may include a fifth pipe 258 connecting the first moisture separator 254 to the airlift assembly 230.

Further, in some embodiments, a total area of the plurality of perforations 402-404 (as shown in FIG. 4) may be at least 50% larger than a cross-sectional delivery area of a second end 260 of the fifth pipe 258.

Figure 3:
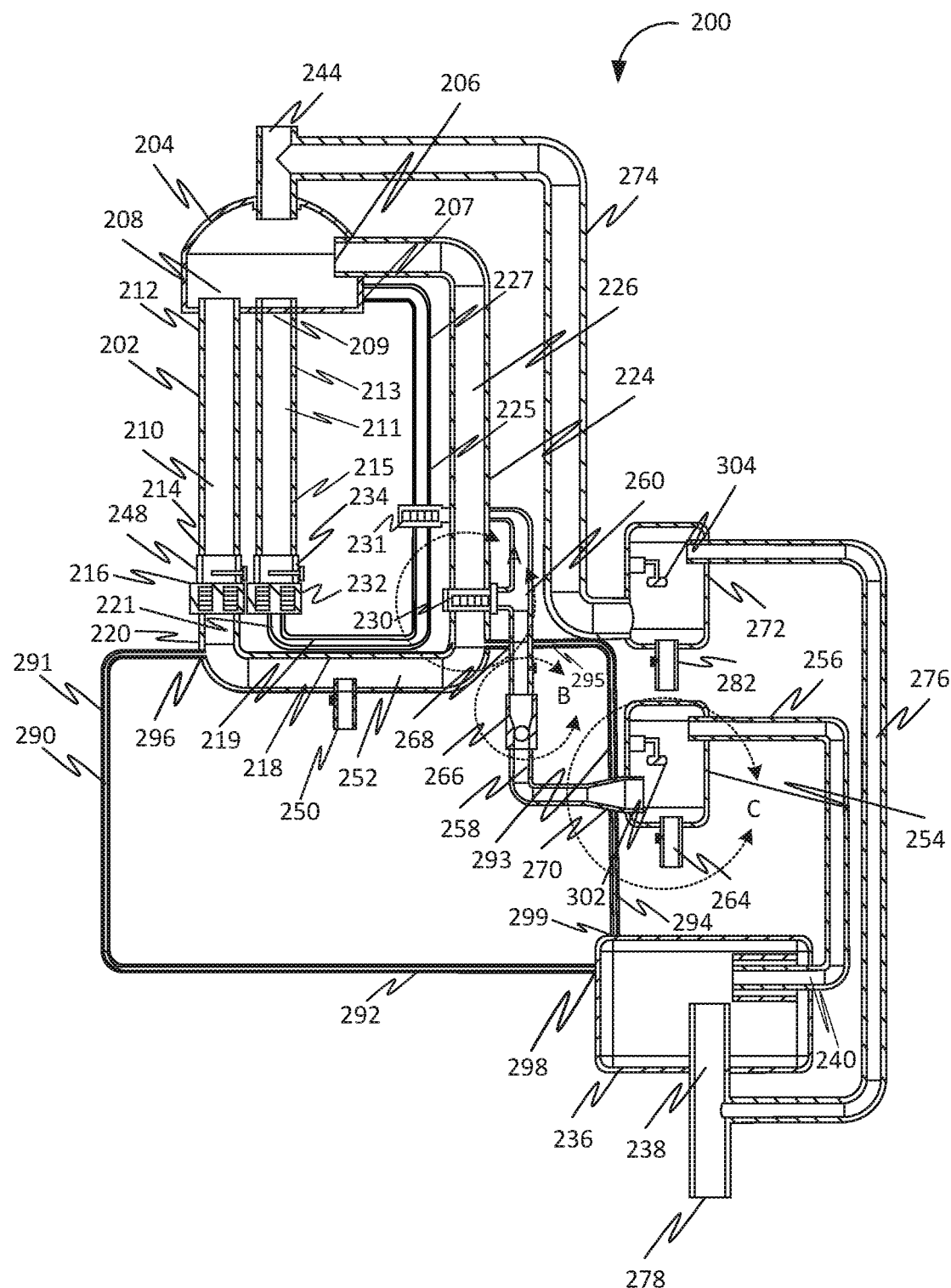
FIG. 3 is a partial front cross sectional view of the hydropower electric generator, in accordance with some embodiments.

Further, in some embodiments, the first moisture separator 254 may include a first high water alarm 302 (as shown in FIG. 3) configured to generate an alarm based on a high level of water in the first moisture separator 254. Further, the first moisture separator 254 may include a second drainage valve 264 configured to facilitate the draining of water from the first moisture separator 254. Further, the second drainage valve 264 may be operated manually.

In further embodiments, the hydropower electric generator 200 may include a check valve 266 configured to permit the flow of air to the first airlift assembly 230 and the second airlift assembly 231 but restrict the flow of water from the first airlift assembly 230 and the second airlift assembly 231 to the first moisture separator 254. Further, in some embodiments, the fifth pipe 258 may include a third flow-control valve 268 situated between the check valve 266 and the airlift assembly 230. Further, the third flow-control valve 268 may be configured to regulate the flow of air to the first airlift assembly 230 and the second airlift assembly 231 and completely close the fifth pipe 258 facilitating servicing of at least one of the first moisture separator 254 and the air pump 236.

Further, in some embodiments, a cross-sectional area of the fifth pipe 258 decreases as the fifth pipe 258 traverses between a first end 270 and the second end 260. Further, the first end 270 may be connected to the first moisture separator 254 using the at least one connecting mechanism and the second end 260 may be connected to the airlift assembly 230 using the at least one connecting mechanism.

In further embodiments, the hydropower electric generator 200 may include a second moisture separator 272 configured to separate moisture from a mixture of air and water. Further, the hydropower electric generator 200 may include a sixth pipe 274 connecting the first air vent 244 of the reservoir 204 and the second moisture separator 272. Further, the hydropower electric generator 200 may include a seventh pipe 276 connecting the second moisture separator 272 to the inlet port 238 of the air pump 236 through a second air vent 278.

Further, in some embodiments, the second moisture separator 272 may include a second high water alarm 304 (as shown in FIG. 3) configured to generate an alarm based on a high level of water in the second moisture separator 272. Further, the second moisture separator 272 may include a third drainage valve 282 configured to facilitate the draining of water from the second moisture separator 272. Further, the third drainage valve 282 may be operated manually.

Further, in some embodiments, each of the first downward flow pipe 210, the second downward flow pipe 211, the first horizontal pipe 218, the second horizontal pipe 219, the first upward flow pipe 226, and the second upward flow pipe 227 may be characterized by a diameter of at least 6 inches. Further, a vertical separation between the reservoir 204 and the first turbine 216 and/or second turbine 232 may be at least 20 feet. Further, the fifth pipe 258 may be characterized by a diameter of at least 1.25 inches.

In further embodiments, the hydropower electric generator 200 may include at least one inverter 284 electrically coupled to at least one of the first DC alternator 217, the second DC alternator 227, and the energy storage device 242. Further, the at least one inverter 284 may be configured to generate AC electrical energy from DC electrical energy. Further, the AC electrical energy may be supplied to a local electrical grid 286 for consumption in a manor.

Further, in an embodiment, at least one of the first flow-control valve 248, the second flow-control valve 234, the second drainage valve 264, the check valve 266, the third flow-control valve 268, the third drainage valve 282, and the first drainage valve 250 may be actuated using an electromechanical actuator. Further, at least one of the downward flow pipe 210, the upward flow pipe 226, the horizontal pipe 218, the first moisture separator 254, and the second moisture separator 272 may include at least one sensor. Further, the at least one sensor may be configured for detecting a parameter associated with at least one of the downward flow pipe 210, the upward flow pipe 226, the horizontal pipe 218, the first moisture separator 254, and the second moisture separator 272. Further, the at least one sensor may be configured for generating a sensor data. Further, the hydropower electric generator 200 may include a processing device configured for analyzing the sensor data to generate a command. Further, the processing device may be communicatively coupled with the at least one sensor and the electromechanical actuator. Further, the electromechanical actuator may be actuated based on the command. Further, the electromechanical actuator may include a solenoid.

Further, in an embodiment, the hydropower electric generator 200 may include a water pump fluidly coupled to an external water source. Further, the water pump may be fluidly coupled to the reservoir 204. Further, the water pump may be configured for transferring the water from the external water source into the reservoir 204. Further, the energy storage device 242 may be configured for receiving electrical energy from an external energy source. Further, the energy storage device 242 may store the electrical energy. Further, the at least one of the at least one inverter 284, the air pump 236, the energy storage device 242, and the water pump may be electrically coupled to the external electric source. Further, the energy storage device 242 may include a second sensor configured for detecting a parameter associated with the energy storage device 242. Further, the second sensor may be configured for generating an energy data. Further, the second sensor may be communicatively coupled to the processing device. Further, the processing device may be configured for analyzing the energy data to generate an order. Further, the external energy source may supply the electrical energy to at least one of the air pump 236 and the water pump based on the order.

FIG. 3 is a partial front cross sectional view of the hydropower electric generator 200, in accordance with some embodiments.

FIG. 4 is an enlarged view of a section A of FIG. 3, in accordance with some embodiments.

Figure 5:
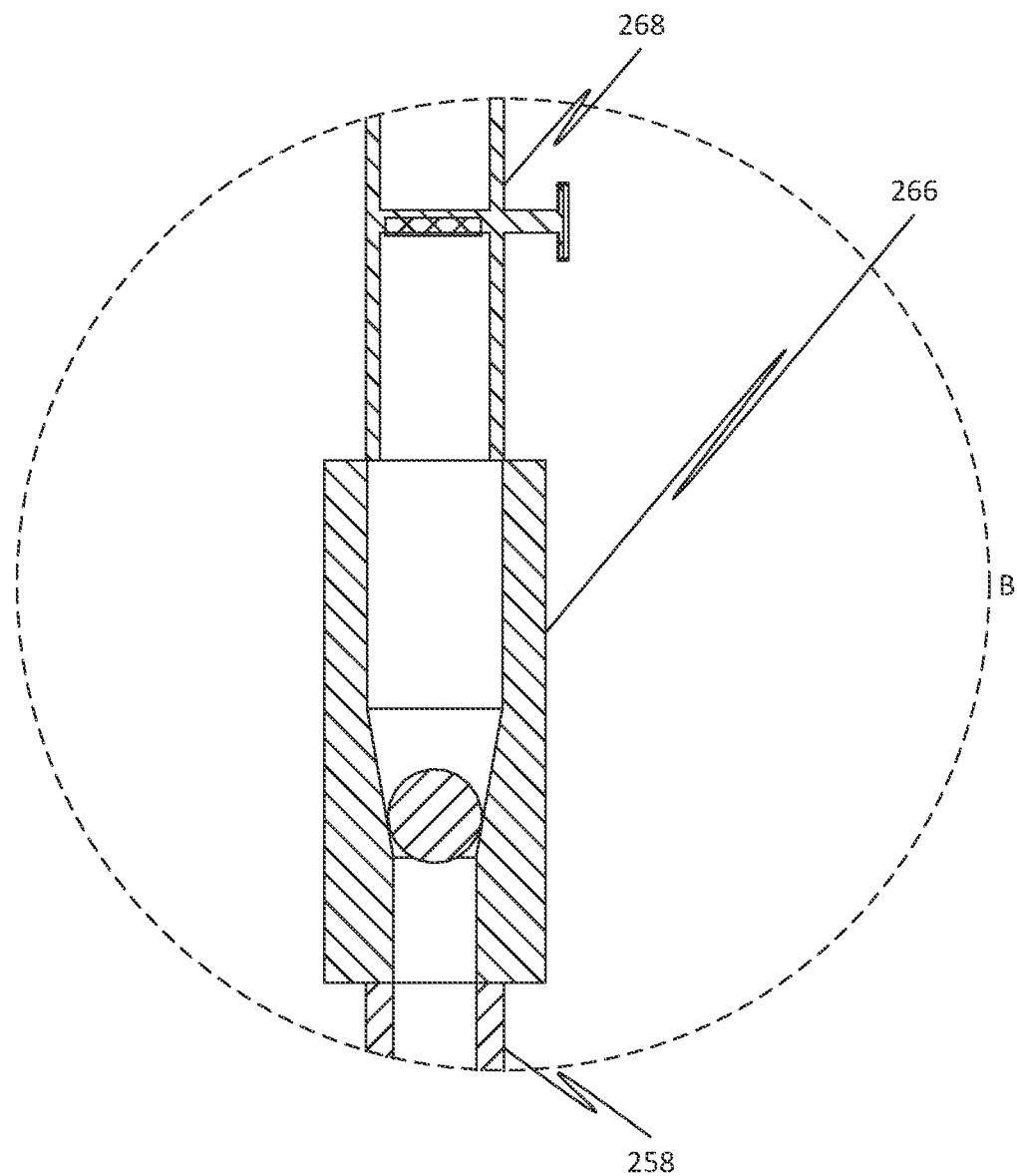
FIG. 5 is an enlarged view of a section B of FIG. 3, in accordance with some embodiments.

FIG. 5 is an enlarged view of a section B of FIG. 3, in accordance with some embodiments.

Figure 6:
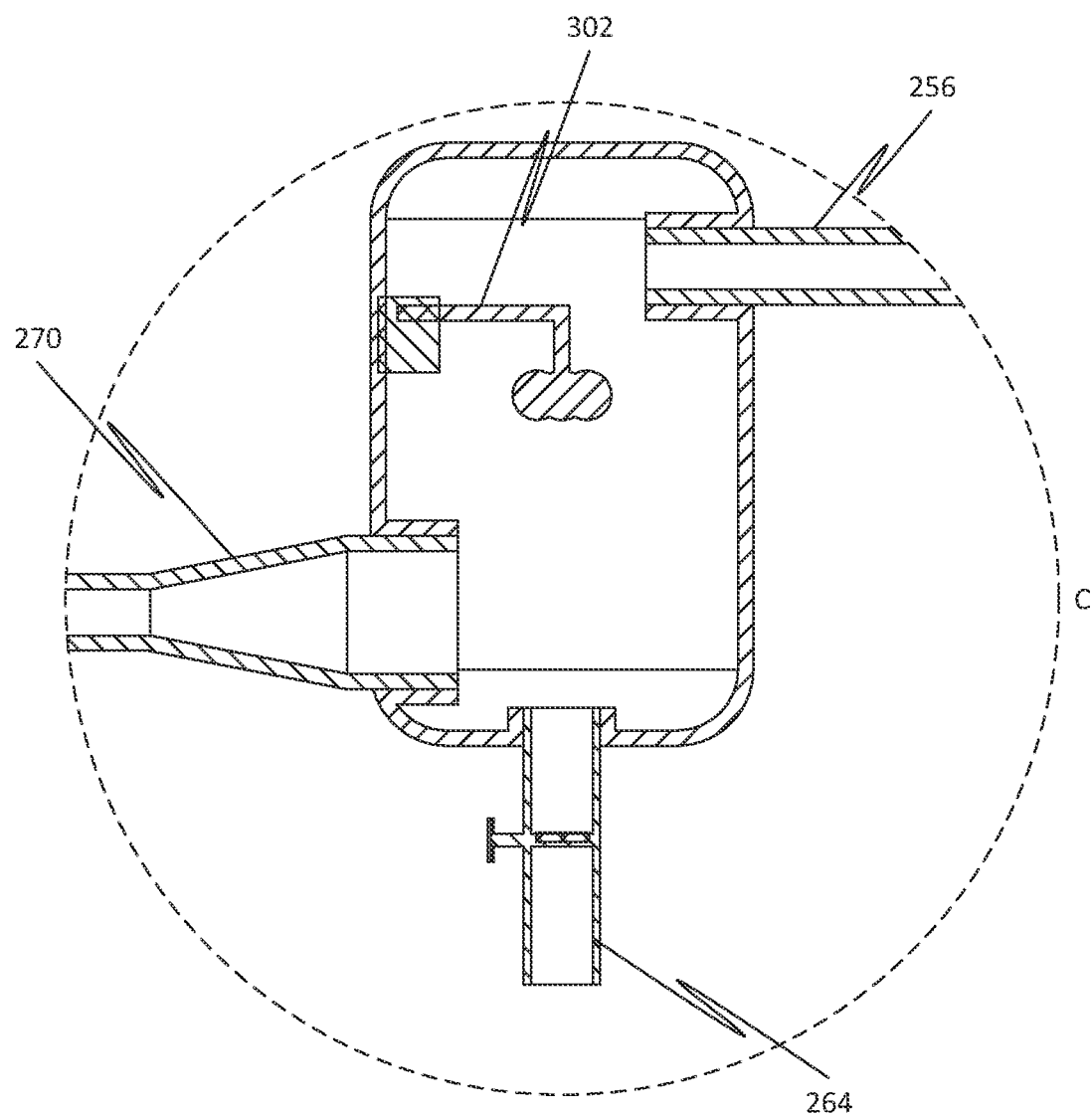
FIG. 6 is an enlarged view of a section C of FIG. 3, in accordance with some embodiments.

FIG. 6 is an enlarged view of a section C of FIG. 3, in accordance with some embodiments.

Figure 8:
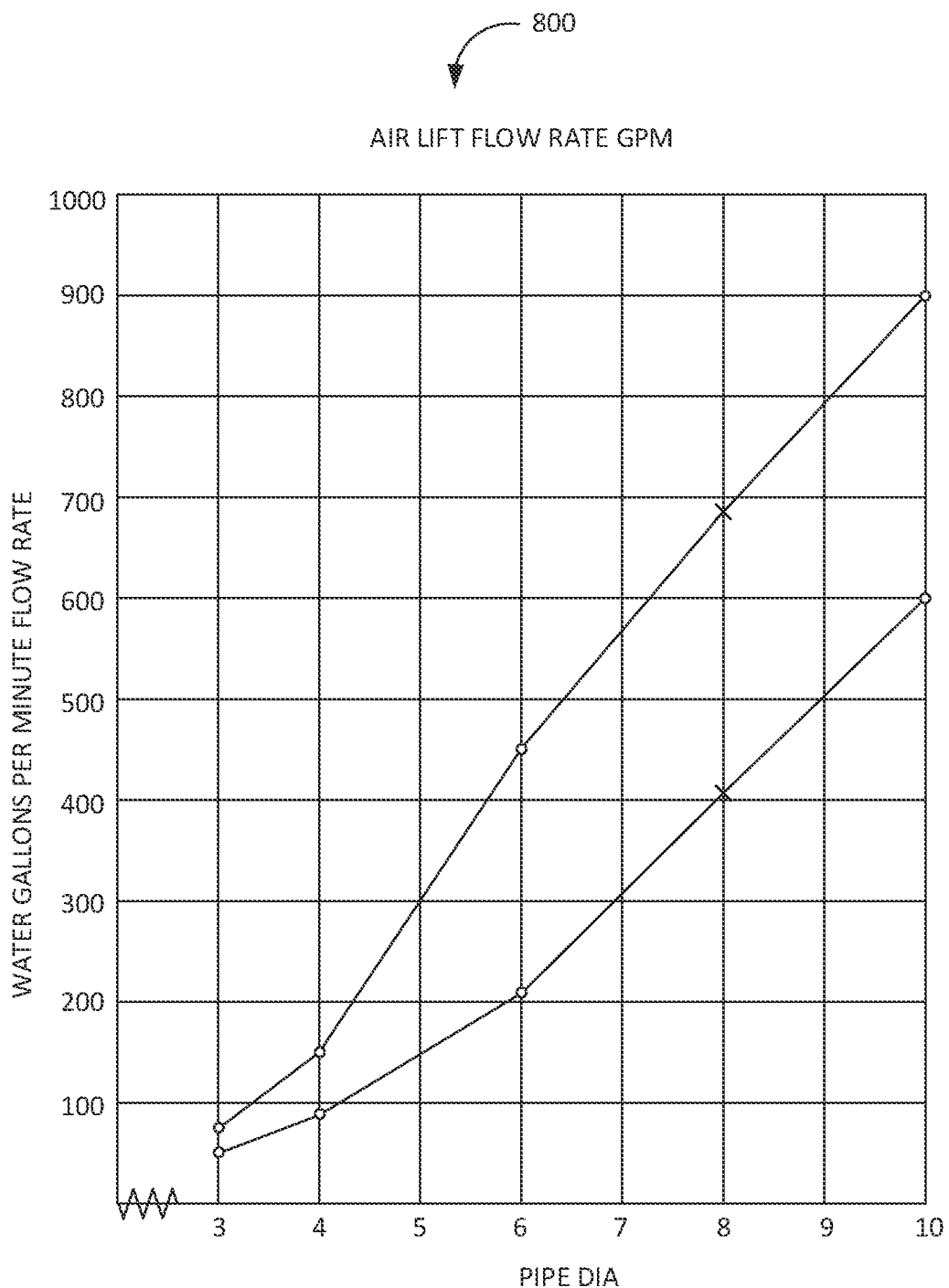
FIG. 8 is a graphical representation for facilitating determination of water flow rate along at least one of the first upward flow pipe, the second upward flow pipe, with varying pipe diameters, in accordance with some embodiments.

FIG. 7 is a table 700 of minimum air pressure required to be introduced to the first
upward flow pipe 226 and the second upward flow pipe 227 for a determined height of a water storage source, in accordance with some embodiments. Further, the water storage source may include the reservoir 204. Further, the air may be introduced at a pressure in accordance with FIG. 7 and the volume requirements in accordance with FIG. 10. For example, a 6" diameter vertical piping for the first downward flow pipe 210, the second downward flow pipe 211, the first upward flow pipe 226 and the second upward flow pipe 227 with a reservoir height of 20 feet requires two 1.25" air supply line (such as the fifth pipe 258) as determined in FIG. 9. This arrangement, which delivers 400 C.F.M. total (as determined from FIG. 10) at a pressure of 8.86 psi (as determined from FIG. 7) will produce 900 G.P.M. flow total (as shown in FIG. 8) of water up the airlift assembly 230 and 231. The 900 G.P.M. of water through the two 6' downflow pipes delivered to two turbines (such as one of the first turbine 216 and the second turbine 232) may produce approximately 5,000 watts of power. The dimensions and metrics of these exemplary components are understood to represent only one possible embodiment of the present disclosure and may vary in conceivable iterations.

FIG. 8 is a graphical representation 800 for facilitating determination of water flow rate along at least one of the first downward flow pipe 210, the second downward flow pipe 211, the first upward flow pipe 226, and the second upward flow pipe 227 with varying pipe diameters, in accordance with some embodiments. Further, the varying pipe diameters may be associated with the at least one of the first downward flow pipe 210, the second downward flow pipe 211, the first upward flow pipe 226, and the second upward flow pipe 227.

Figure 9:
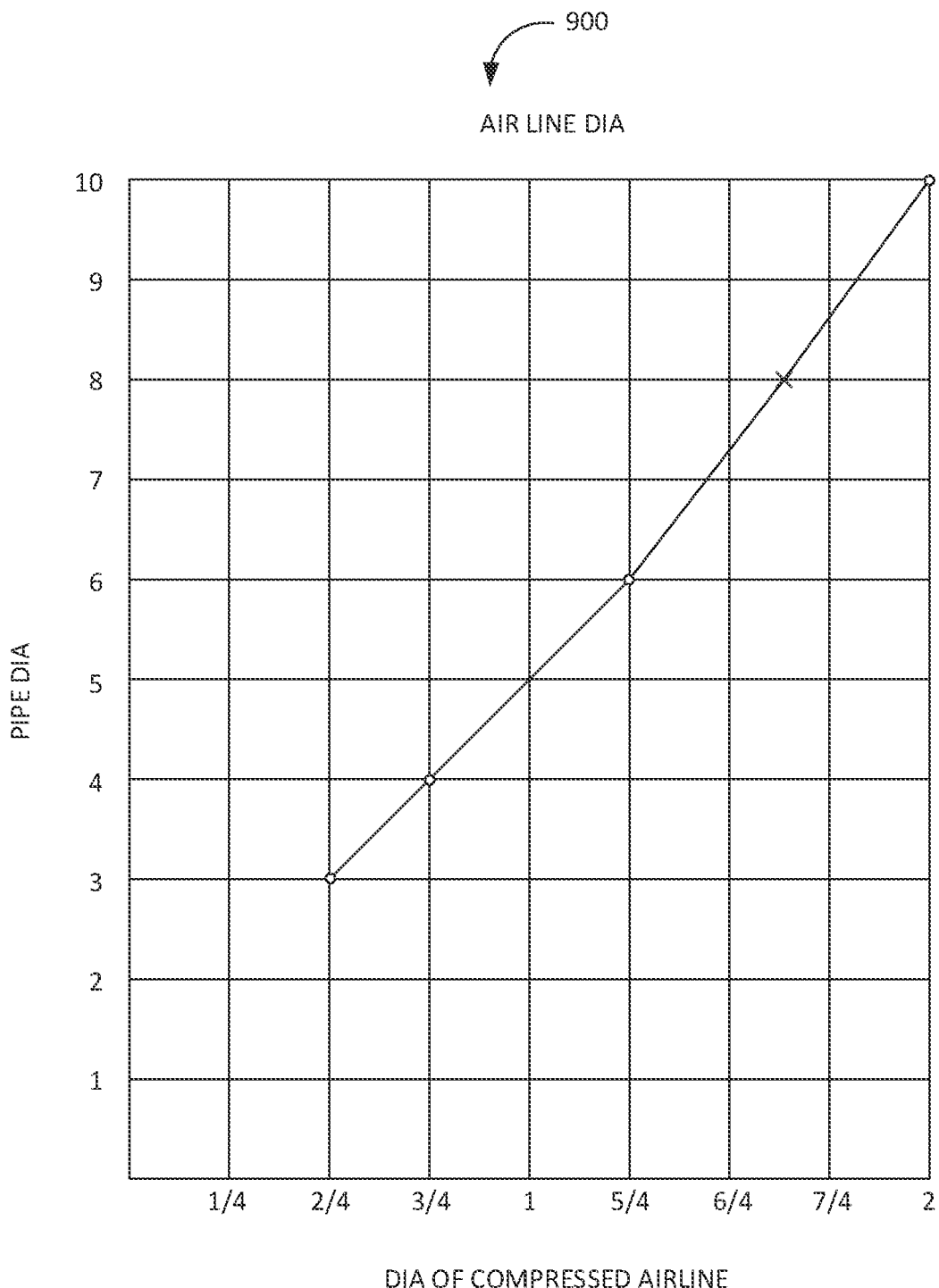
FIG. 9 is a graphical representation for facilitating the determination of a diameter of the air supply line based on a diameter of the closed conduit, in accordance with some embodiments.

FIG. 9 is a graphical representation 900 for facilitating the determination of a diameter of the air supply line based on a diameter of the closed conduit 202, in accordance with some embodiments. Accordingly, the air supply line may include at least one of the fourth pipe 256 and the fifth pipe 258

Figure 10:
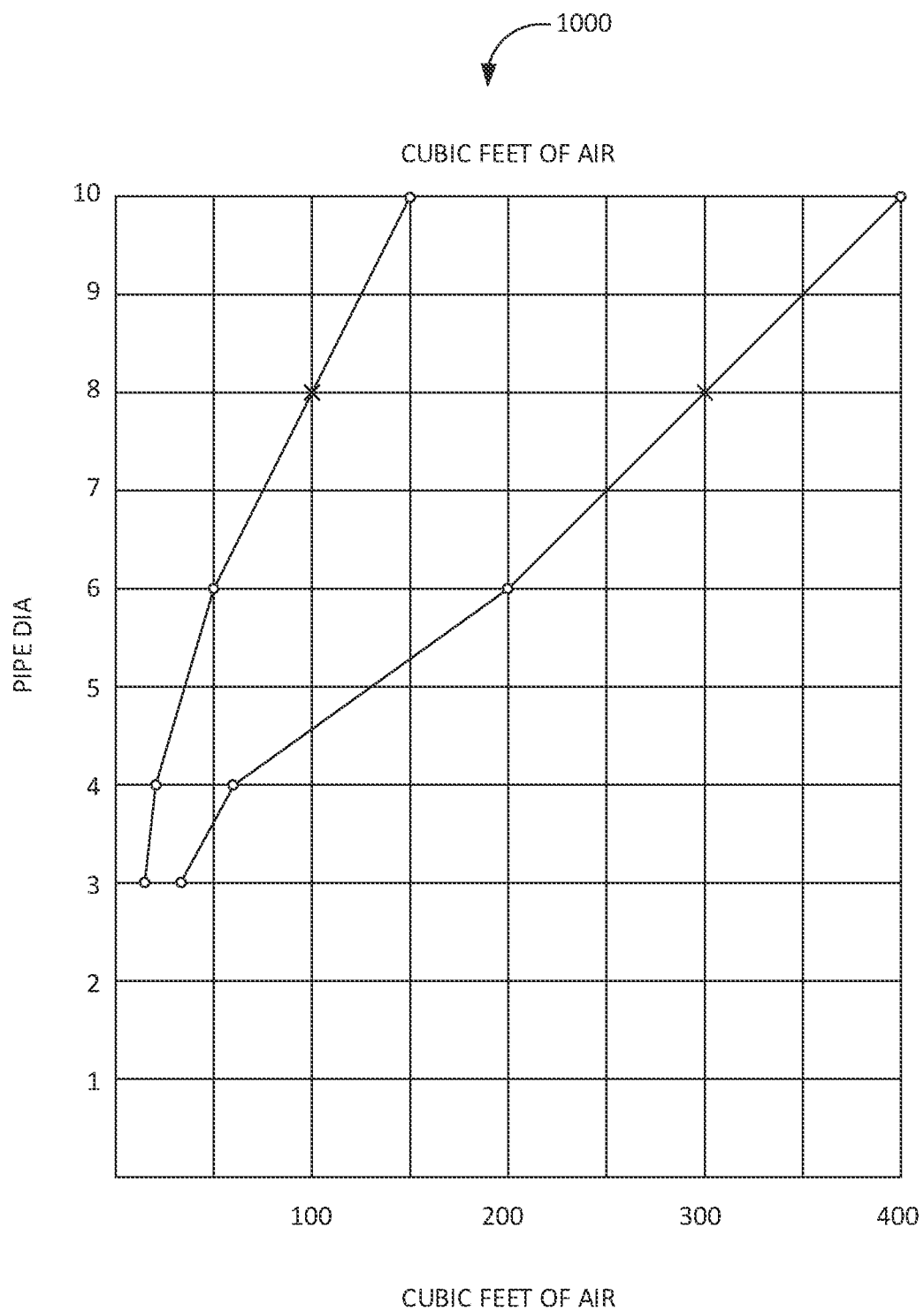
FIG. 10 is a graphical representation for determining the minimum cubic feet of air delivered to the first and second upward flow pipes, in accordance with some embodiments.

FIG. 10 is a graphical representation 1000 for determining the minimum cubic feet of air delivered to the first upward flow pipe 226 and the second upward flow pipe 227, in accordance with some embodiments. Accordingly, the minimum cubic feet of air delivered to the first upward flow pipe 226, and the second upward flow pipe 226 may vary based on diameters of at least one of the pipes.

Figure 11:
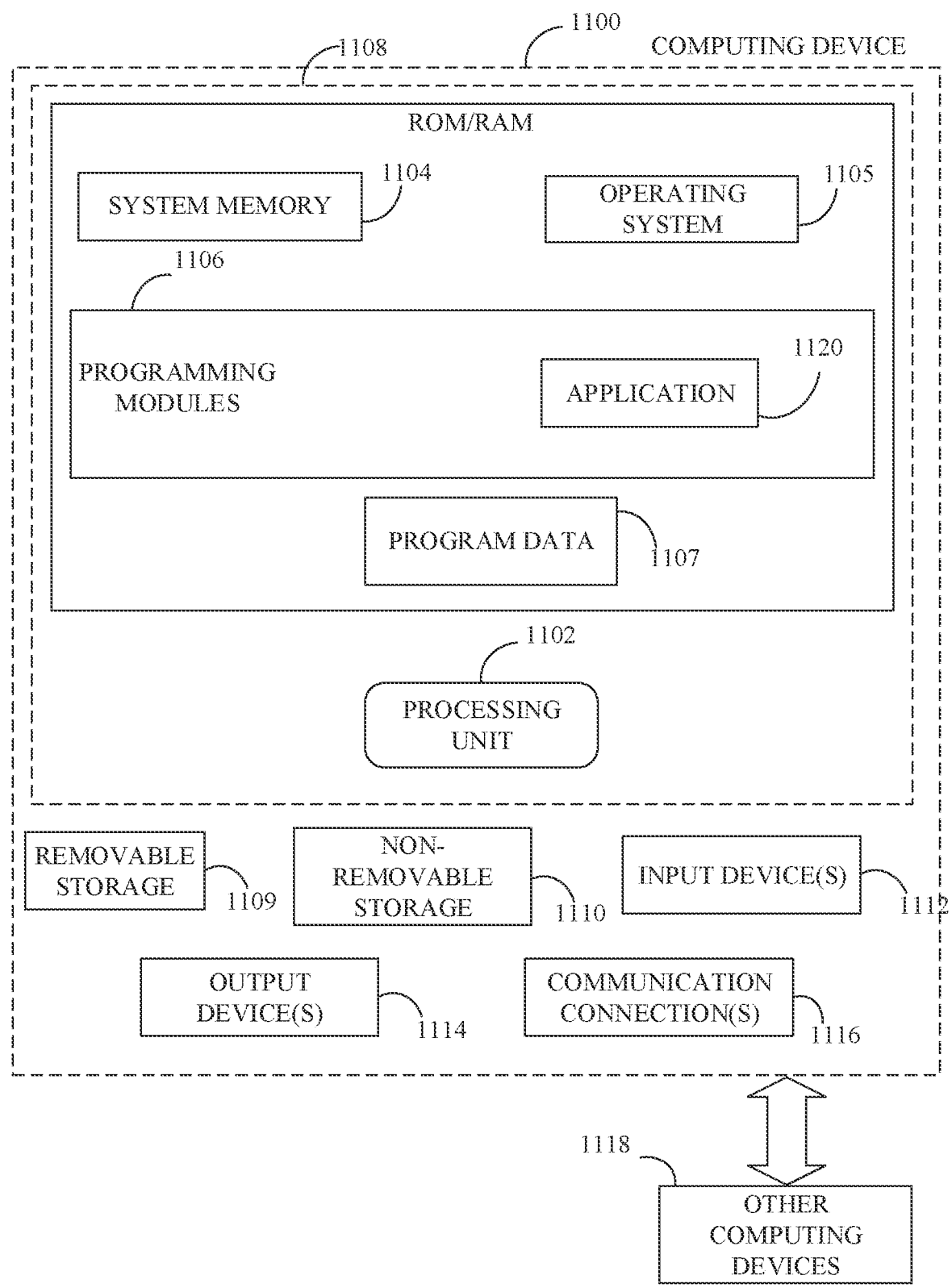
FIG. 11 is a block diagram of a computing device for implementing the methods disclosed herein, in accordance with some embodiments.

With reference to FIG. 11, a system consistent with an embodiment of the disclosure may include a computing device or cloud service, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination. System memory 1104 may include operating system 1105, one or more programming modules 1106, and may include a program data 1107. Operating system 1105, for example, may be suitable for controlling computing device 1100's operation. In one embodiment, programming modules 1106 may include image-processing module, machine learning module. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

With reference to FIG. 12, the use of a first downward flow pipe and a second downward flow pipe, each paired with a turbine and a DC alternator is an improvement over a system that uses a single downward flow pipe paired with a turbine and a DC alternator as well as a turbine and a DC alternator paired with an upward flow pipe. Specifically, in the present invention, for 6" piping in each of the downward flow pipes and a head of 30', the total theoretical power output is 4.94 Kw. For 8" piping in each of the downward flow pipes and a head of 30', the total theoretical power output is 7.47 Kw. For 10" piping in each of the downward flow pipes and a head of 30', the total theoretical power output is 9.89 Kw. These calculations of theoretical power output of the present invention are significantly improved over similar systems using a single downward flow pipe and a single turbine at the downward flow pipe. These theoretical power output calculations are based on an efficiency rating of 97% for single belt drives.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and non-volatile, removable and non-removable media implemented in any method or technology for storage of information, such as computer-readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, a location sensor, a camera, a biometric sensor, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1104, including operating system 1105. While executing on processing unit 1102, programming modules 1106 (e.g., application 1120 such as a media player) may perform processes including, for example, one or more stages of methods, algorithms, systems, applications, servers, databases as described above. The aforementioned process is an example, and processing unit 1102 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

With regard to the above description it is to be realized that the optimum dimensional relationships for the parts of the present disclosure, to include variations in size, materials, shape, form, function and manner of operation, assembly and use, are deemed readily apparent to those skilled in the art, and all equivalent relationships to those illustrated in the drawings and described in the description are intended to be encompassed by the present disclosure.

Although the present disclosure has been explained in relation to its preferred embodiment, it is to be understood that many other possible modifications and variations can be made without departing from the spirit and scope of the disclosure.

What is claimed is:

1. A hydropower electric generator comprising:
   a closed conduit comprising:
     a reservoir configured to hold water, wherein the reservoir comprises a first inlet port, a second inlet port, a first outlet port, and a second outlet port;
     a first downward flow pipe comprising an upper end and a lower end, wherein the upper end is connected to the first outlet port of the reservoir and configured to permit downward flow of the water from the reservoir toward the lower end due to gravitational force, wherein the first downward flow pipe comprises:
       a first turbine configured to intercept the downward flow of the water and generate rotational force; and
       a first DC alternator coupled to the first turbine, wherein the first DC alternator is configured to generate DC electrical energy based on the rotational force generated by the first turbine;
     a second downward flow pipe comprising an upper end and a lower end, wherein the upper end is connected to the second outlet port of the reservoir and configured to permit downward flow of the water from the reservoir toward the lower end due to gravitational force, wherein the second downward flow pipe comprises:
       a second turbine configured to intercept the downward flow of the water and generate rotational force; and
       a second DC alternator coupled to the first turbine, wherein the second DC alternator is configured to generate DC electrical energy based on the rotational force generated by the second turbine;
     a first horizontal pipe comprising an inlet end and an outlet end, wherein the inlet end of the first horizontal pipe is connected to the lower end of the first downward flow pipe and the outlet end of the first horizontal pipe is connected to a lower end of a first upward flow pipe;
     a second horizontal pipe comprising an inlet end and an outlet end, wherein the inlet end of the second horizontal pipe is connected to the lower end of the second downward flow pipe and the outlet end of the second horizontal pipe is connected to a lower end of a second upward flow pipe;

the first upward flow pipe, wherein the lower end of the first upward flow pipe is connected to the outlet end of the first horizontal pipe and the upper end of the first upward flow pipe is connected to the first inlet port of the reservoir, wherein the first upward flow pipe comprises:
   a first airlift assembly configured to receive compressed air into the first upward flow pipe;
the second upward flow pipe, wherein the lower end of the second upward flow pipe is connected to the outlet end of the second horizontal pipe and the upper end of the second upward flow pipe is connected to the second inlet port of the reservoir, wherein the second upward flow pipe comprises:
   a second airlift assembly configured to receive compressed air into the upward flow pipe;
an air pump configured to generate the compressed air based on electrical energy, wherein the air pump comprises an inlet port of the air pump and an outlet port of the air pump, wherein the inlet port of the air pump is configured to receive air from a surrounding atmosphere of the hydropower electric generator, wherein the outlet port of the air pump is connected to the airlift assembly;
an energy storage device electrically connected to each of the first DC alternator and the second DC alternator, wherein the energy storage device is configured for storing the electrical energy produced by each of the first DC alternator and the second DC alternator, wherein the air pump is electrically connected to the energy storage device and receives electrical energy from the energy storage device;
a departure cooling line comprising a first end and a second end;
a return cooling line comprising a first end and a second end;
the first horizontal pipe further comprising a departure outlet port, wherein the departure outlet port is connected to the first end of the departure cooling line and is configured to allow water to flow to the departure cooling line;
the first upward flow pipe further comprising a return inlet port, wherein the return inlet port is connected to the second end of the return cooling line and is configured to receive water from the return cooling line; and
the air pump further comprising an inlet cooling port and an outlet cooling port, wherein the inlet cooling port is connected to the second end of the departure cooling line and is configured to receive water from the departure cooling line, wherein the outlet cooling port is connected to the first end of the return cooling line and is configured to allow water to flow to the return cooling line.

2. The hydropower electric generator of claim 1, wherein the reservoir further comprises a first air vent located on an upper surface of the reservoir, wherein the first air vent is configured to permit air to vent from the reservoir to the atmosphere through the first air vent.

3. The hydropower electric generator of claim 1, wherein:
the first downward flow pipe comprises a first flow-control valve located towards the lower end of the downward flow pipe, wherein the first flow-control valve is configured to control flow of water through the first downward flow pipe; and
the second downward flow pipe comprises a second flow-control valve located towards the lower end of the downward flow pipe, wherein the second flow-control valve is configured to control flow of water through the second downward flow pipe.

4. The hydropower electric generator of claim 3, wherein:
the first flow-control valve is configured to perform at least one of regulate, start and stop flow of water through the first downward flow pipe; and
the second flow-control valve is configured to perform at least one of regulate, start and stop flow of water through the second downward flow pipe.

5. The hydropower electric generator of claim 1, wherein at least one of the first turbine and the second turbine comprises a reaction turbine comprising at least one of a bronze propeller and a non-metallic propeller.

6. The hydropower electric generator of claim 1, wherein the first horizontal pipe comprises a first drainage valve configured to drain and fill a lower section of the closed conduit, facilitating servicing of the first turbine and the second turbine.

7. The hydropower electric generator of claim 1, wherein the airlift assembly comprises a core with a plurality of perforations.

8. The hydropower electric generator of claim 7 further comprising:
   a first moisture separator configured to separate moisture from a mixture of air and water;
   a fourth pipe connecting the air pump to the first moisture separator; and
   a fifth pipe connecting the first moisture separator to the air lift assembly.

9. The hydropower electric generator of claim 8, wherein a total area of the plurality of perforations is at least 50% larger than a cross-sectional delivery area of a second end of the fifth pipe.

10. The hydropower electric generator of claim 8, wherein the first moisture separator further comprises:
   a first high water alarm configured to generate an alarm based on a high level of water in the first moisture separator; and
   a second drainage valve configured to facilitate draining of water from the first moisture separator.

11. The hydropower electric generator of claim 8 further comprising a check valve configured to permit flow of air to the airlift assembly but restrict flow of water from the airlift assembly to the first moisture separator.

12. The hydropower electric generator of claim 11, wherein the fifth pipe further comprises a third flow-control valve situated between the check valve and the airlift assembly, wherein the third flow-control valve is configured to regulate flow of air to the airlift assembly and completely close the fifth pipe facilitating servicing of at least one of the first moisture separator and the air pump.

13. The hydropower electric generator of claim 8, wherein a cross-sectional area of the fifth pipe decreases as the fifth pipe traverses between a first end and a second end, wherein the first end is connected to the first moisture separator and the second end is connected to the air lift assembly.

14. The hydropower electric generator of claim 8 further comprises:
   a second moisture separator configured to separate moisture from a mixture of air and water;
   a sixth pipe connecting a first air vent of the reservoir and the second moisture separator; and
   a seventh pipe connecting the second moisture separator to the inlet port of the air pump through a second air vent.

15. The hydropower electric generator of claim 14, wherein the second moisture separator further comprises:

a second high water alarm configured to generate an alarm based on a high level of water in the second moisture separator; and a third drainage valve configured to facilitate draining of water from the second moisture separator.

16. The hydropower electric generator of claim 14, wherein each of the first downward flow pipe, the second downward flow pipe, the first horizontal pipe, the second horizontal pipe, the first upward flow pipe, and the second upward flow pipe is characterized by a diameter of at least 6 inches, wherein a vertical separation between the reservoir and the first turbine is at least 20 feet, wherein the fifth pipe is characterized by a diameter of at least 1.25 inches.

17. The hydropower electric generator of claim 1 further comprising at least one inverter electrically coupled to at least one of the first DC alternator, the second DC alternator and the energy storage device, wherein the at least one inverter is configured to generate AC electrical energy from DC electrical energy.

18. A hydropower electric generator comprising:
a closed conduit comprising:
  a reservoir configured to hold water, wherein the reservoir comprises a first inlet port, a second inlet port, a first outlet port, and a second outlet port;
  a first downward flow pipe comprising an upper end and a lower end, wherein the upper end is connected to the first outlet port of the reservoir and configured to permit downward flow of the water from the reservoir toward the lower end due to gravitational force, wherein the first downward flow pipe comprises:
    a first turbine configured to intercept the downward flow of the water and generate rotational force; and
    a first DC alternator coupled to the first turbine, wherein the first DC alternator is configured to generate DC electrical energy based on the rotational force generated by the first turbine;
  a second downward flow pipe comprising an upper end and a lower end, wherein the upper end is connected to the second outlet port of the reservoir and configured to permit downward flow of the water from the reservoir toward the lower end due to gravitational force, wherein the second downward flow pipe comprises:
    a second turbine configured to intercept the downward flow of the water and generate rotational force; and
    a second DC alternator coupled to the first turbine, wherein the second DC alternator is configured to generate DC electrical energy based on the rotational force generated by the second turbine;
  a first horizontal pipe comprising an inlet end and an outlet end, wherein the inlet end of the first horizontal pipe is connected to the lower end of the first downward flow pipe and the outlet end of the first horizontal pipe is connected to a lower end of a first upward flow pipe;
  a second horizontal pipe comprising an inlet end and an outlet end, wherein the inlet end of the second horizontal pipe is connected to the lower end of the second downward flow pipe and the outlet end of the second horizontal pipe is connected to a lower end of a second upward flow pipe;
  the first upward flow pipe, wherein the lower end of the first upward flow pipe is connected to the outlet end of the first horizontal pipe and the upper end of the first upward flow pipe is connected to the first inlet port of the reservoir, wherein the first upward flow pipe comprises:
    a first airlift assembly configured to receive compressed air into the first upward flow pipe, wherein the airlift assembly comprises a core with a plurality of perforations, wherein the plurality of perforations is configured to create a negative pressure based on a vertical rise of the air in a water column in the upward pipe provide kinetic energy to assist water flow in the closed loop;
  the second upward flow pipe, wherein the lower end of the second upward flow pipe is connected to the outlet end of the second horizontal pipe and the upper end of the second upward flow pipe is connected to the second inlet port of the reservoir, wherein the second upward flow pipe comprises:
    a second airlift assembly configured to receive compressed air into the second upward flow pipe, wherein the airlift assembly comprises a core with a plurality of perforations, wherein the plurality of perforations is configured to create a negative pressure based on a vertical rise of the air in a water column in the upward pipe provide kinetic energy to assist water flow in the closed loop;
an air pump configured to generate the compressed air based on electrical energy, wherein the air pump comprises an inlet port of the air pump and an outlet port of the air pump, wherein the inlet port of the air pump is configured to receive air from a surrounding atmosphere of the hydropower electric generator, wherein the outlet port of the air pump is connected to the airlift assembly;
an energy storage device electrically connected to each of the first DC alternator and the second DC alternator, wherein the energy storage device is configured for storing the electrical energy produced by each of the first DC alternator and the second DC alternator, wherein the air pump is electrically connected to the energy storage device and receives electrical energy from the energy storage device;
a departure cooling line comprising a first end and a second end;
a return cooling line comprising a first end and a second end;
the first horizontal pipe further comprising a departure outlet port, wherein the departure outlet port is connected to the first end of the departure cooling line and is configured to allow water to flow to the departure cooling line;
the first upward flow pipe further comprising a return inlet port, wherein the return inlet port is connected to the second end of the return cooling line and is configured to receive water from the return cooling line; and
the air pump further comprising an inlet cooling port and an outlet cooling port, wherein the inlet cooling port is connected to the second end of the departure cooling line and is configured to receive water from the departure cooling line, wherein the outlet cooling port is connected to the first end of the return cooling line and is configured to allow water to flow to the return cooling line.

* * * * *